United States Patent

Cool

[15] 3,671,882
[45] June 20, 1972

[54] APPARATUS FOR MIXING GAS IN A FLUID MIXING LASER

[72] Inventor: Terrill A. Cool, Trumansburg, N.Y.
[73] Assignee: The United States of America as represented by the Secretary of the Navy
[22] Filed: Sept. 25, 1970
[21] Appl. No.: 75,593

[52] U.S. Cl. ........................................................331/94.5
[51] Int. Cl. ............................................................H01s 3/00
[58] Field of Search .................................................331/94.5

[56] References Cited

OTHER PUBLICATIONS

Cool et al.; " Gain Measurements in a Fluid Mixing Carbon Dioxide 2 Laser System," Applied Physics Letters, Vol. 14, pp. 70– 72, January 1969.

Primary Examiner—Ronald L. Wilbert
Assistant Examiner—Edward S. Bauer
Attorney—R. S. Sciascia, L. I. Shrago and R. K. Tendler

[57] ABSTRACT

Apparatus is disclosed which can continuously mix indefinitely large volumes of gases in characteristic times that are short compared to characteristic collisional relaxation times for the excitation energy for the component gases. The present technique has application to flowing gas laser systems in that it provides a means to mix large volumes of gases together to initiate an energy exchange process between the mixing atomic or molecular components, or to initiate a chemical reaction involving the mixing of reactant components to form product atoms or molecules in an excited state.

2 Claims, 7 Drawing Figures

Terrill A. Cool
INVENTOR

Terrill A. Cool
INVENTOR

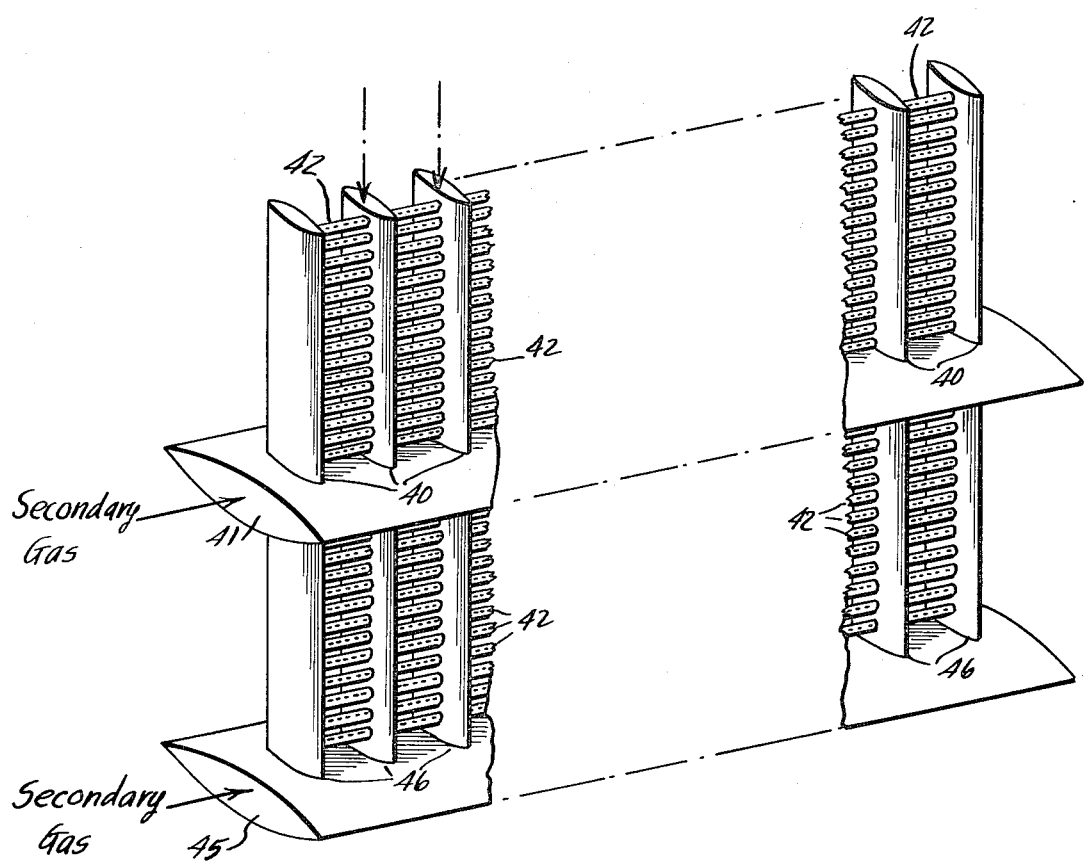

APPARATUS FOR MIXING GAS IN A FLUID MIXING LASER

The invention described herein may be manufactured and used by or for the Government of the United States of America for governmental purposes without the payment of any royalties thereon or therefor.

This invention relates to fluid mixing lasers and, more particularly, to a manifold-injector array which enables uniform mixing to occur in a time which is short compared to the relaxation time of the mixed gases.

In fluid mixing lasers, the ability to mix the gases uniformly and quickly is of utmost importance in order to preserve the population inversion at least until the mixing is complete. Fluid mixing lasers take the form of either a chemical laser in which two gases are reacted to yield an excited product; or a gas dynamic laser in which an excited gas couples energy into an unexcited gas which subsequently lases. For the purposes of this patent, this type gas dynamic laser will be referred to as an "energy exchange" gas laser and should be distinguished from the quick expansion gas dynamic lasers in which the excited gas is ejected from a quick expansion nozzle.

The energy exchange gas laser was first built by C. K. N. Patel who discovered that it was possible to diffuse an excited carrier gas into an unexcited gas in order to cause a population inversion in the unexcited gas. The energy delivered by the carrier gas is coupled to the unexcited gas by either electronic, vibrational or rotational coupling techniques. Heretofore, this transfer of energy from an excited gas to an unexcited gas was impractical because uniform mixing could not be accomplished in a time short compared to the relaxation time of the mixed gas. Attempts at mixing an excited and unexcited gas resulted in degradation of the quality of any laser beam and produced low gains. Gains from prior electrically excited "energy exchange" gas lasers were on the order of 1.0 per meter as compared with gains of 5.5–6 per meter with the utilization of the subject manifold and rapid mixing array.

Chemical lasers did not produce high gains or high quality beams for the same reason as that of the "energy exchange" gas lasers. Uniform mixing could not be accomplished quickly enough before a substantial portion of the excited gas had relaxed to its ground state. High gains for chemical lasers were not achieved because characteristic collisional relaxation times for the excitation energy of the component gases were too short for conventional mixing techniques.

The manifold-injector array, according to the present invention, allows continuous mixing of indefinitely large volumes of gas in characteristic times that are two orders of magnitude shorter than relaxation times of the mixed gases. This allows gas to be pumped through the laser at high speed while effecting a uniform mixture of the gases. As a result, surfaces transverse to the gas flow do not affect laser quality immediately downstream of the array and, thus, an array of indefinitely large size may be used to mix indefinitely large volumes of gas. As the volume of gas increases, the power output of the laser increases proportionately.

It is therefore an object of this invention to provide a manifold and injection means for mixing large volumes of gases in a fluid mixing laser system.

It is another object of this invention to provide a gas mixing manifold which permits the mixing of excited and unexcited gases in a uniform manner and in a time short compared to the relaxation times of the mixed gas.

It is a further object of this invention to provide a gas mixing array which includes a multiplicity of small injection orifices for diffusing the gas which emanates from these orifices with a gas flowing past this injected gaseous flow.

Other objects, advantages and novel features of the invention will become apparent from the following detailed description thereof when considered in conjunction with the accompanying drawings in which like numerals represent like parts throughout and wherein:

FIG. 7 shows an expanded matrix of injectors and manifolds and indicates how the manifold-injector matrix may be enlarged to accommodate larger volumes of gas.

Figure 1:
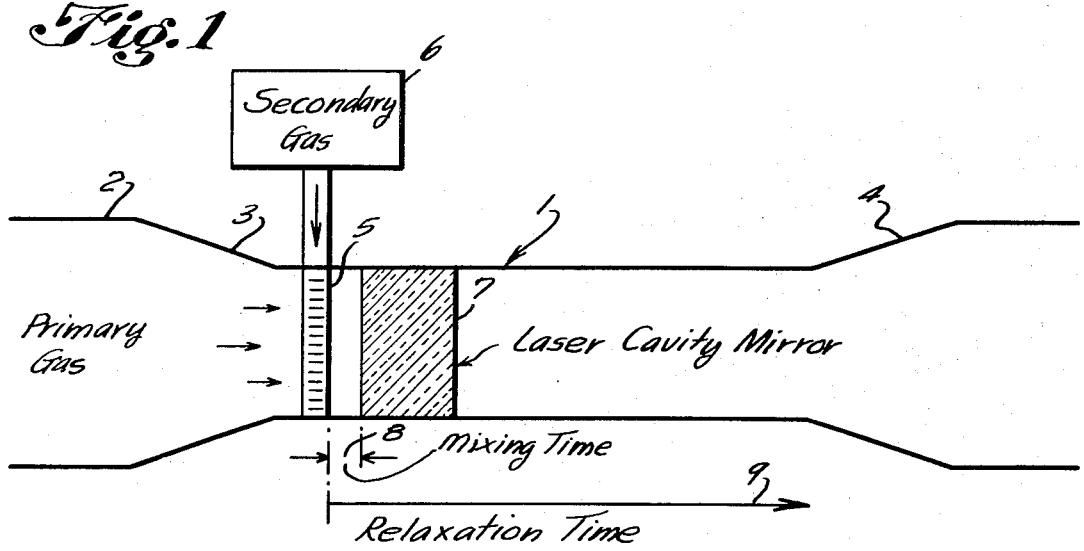
FIG. 1 is a schematic diagram of a flowing gas laser in which the manifold-injector array has been placed.

The present technique provides a means to mix large volumes of gases together to initiate an energy exchange process between the mixed atomic or molecular components or to initiate a chemical reaction between the mixed reactant compounds to form product atoms or molecules having the appropriate excitation.

In either the chemical laser or the energy exchange laser, one of the factors which affects the recombination rate of an excited gas is wall surface recombination. In gas lasers where there is a high-speed flow, the effects of wall surface recombination are decreased. The interposition of the subject array in the gas flow stream does not significantly increase the wall surface recombination rate because of the aerodynamic design of the array structure. This follows because high-speed flowing gas laser systems have characteristic flow transit times which are much less than the characteristic times for diffusion of the component gas species to the walls. The subject array is designed to minimize surface dependent influences which limit the gain, tube size, and ultimate power outputs of flowing gas lasers.

These high-speed flowing systems offer a uniform and low translation gas temperature which can be maintained by rejecting unusable energy with the existing flow rather than by requiring that this energy be lost at the wall surface. In addition, a more uniform excitation can be accomplished by minimizing the influence of surface recombination as a loss mechanism for ions in the discharge. A properly designed high-speed flow system therefore provides a uniformly high gain that is independent of dimensions transverse to the flow direction.

It has further been found that a laser can be fabricated with a gain independent of tube diameter. These two factors allow for the utilization of any size manifold-injector matrix. Since the surfaces of the subject manifold-injector matrix are oriented transverse to the flow field, a multiple air foil injection system, as described hereinafter, may be used to extend the dimensions transverse to the flow and thus enable rapid mixing of increasingly larger volumes of gases. The increase in the volume of gas that can be mixed results in the production of higher power laser beams.

The subject array is a multiple air foil injector device which not only enables the rapid mixing of the gases but, in the case of thermally excited gases, provides a nozzle from which the gases may expand. This matrixed manifold and injector combination offers a means to uniformly mix gases in characteristic times less than $10^{-4}$ seconds, which are short compared to the characteristic collisional relaxation times of $10^{-3}$ seconds for the excitation energies of the mixed or product gases under static pressure conditions from 1 to 100 torr, mean flow velocities from 10 to 1,000 meters per second, and free electron densities less than about $10^{12}$ per cubic centimeter. This fast mixing characteristic can be obtained for indefinitely large volumes of mixing gases by increasing the number of manifolds and injectors while keeping the size and spacing of injectors and orifices small enough for rapid mixing. In addition, uniform mixing is accomplished in a plane of indefinitely large dimensions transverse to the mixed flow direction which allows the construction of laser systems with an approximately uniform gain for a transverse optical axis located in a plane immediately downstream of the array.

In the case of "energy exchange" lasers, the manifold-injector array configuration allows upstream gases to pass between adjacent sections of the manifold and to mix with the unexcited gas in such a way that the gas mixture is not subject to any appreciable wall de-excitation or surface reaction process when appropriate injector size and spacings are utilized. Since there is no appreciable wall de-excitation or surface reaction, gases may be excited by electrical discharge, heating, dissociation, or ionization and may be retained in the prepared state with little destruction at wall surfaces. In either the "energy exchange" or chemical reaction lasers, the injected gas may be emitted parallel with the primary gas flow, lateral to this flow, or even against the flow without appreciable wall de-excitation even under subsonic, supersonic or hypersonic conditions at the matrix.

Referring to FIG. 1, a schematic diagram of a laser is shown with a laser cavity preceded by a primary gas delivery tube 2 and throat 3. At the downstream end of the laser cavity is an expanded section 4 through which the exhaust gas passes. The manifold-injector matrix 5 is located at the throat section 3 and is fed by a secondary gas supply 6. The gas in this supply is in its ground state. In the thermal excitation mode, this gas is kept cool relative to the excited primary gas flowing through tube 2 and throat 3. Throat 3 is included to compact the primary gas stream and to remove any flow anomalies which may exist in the larger delivery tube 2. This uniform flow is preserved through the matrix or array enabling both more uniform mixing and a more uniform fluid flow downstream of the matrixed array. Immediately downstream of matrix 5 are located the usual laser cavity mirrors 7. The position of the mirrors with respect to the matrix is not as critical as indicated in the prior art because of the aforementioned rapid mixing of the primary and secondary gases by the subject array. For most gases used in a fluid mixing laser, the relaxation time of the excited gas is on the order of $10^{-3}$ seconds. Until the adaptation of this matrix to fluid mixing laser systems, uniform mixing time exceeded this relaxation time by an order of magnitude. The utilization of matrix 5 coupled with the throat 3 portion of tube 2 allows for mixing times on the order of $10^{-5}$ seconds and further provides a compacted homogeneous flow downstream of the matrix. The relationship of the gas mixing time to the relaxation time is shown by arrows 8 and 9 of FIG. 1. Single mode operation of this fluid mixing laser is possible with proper mirror position and gas proportions, and with appropriate velocities. Multimode operation is achieved more easily with total gains per meter of 5.5–6.

Figure 2:
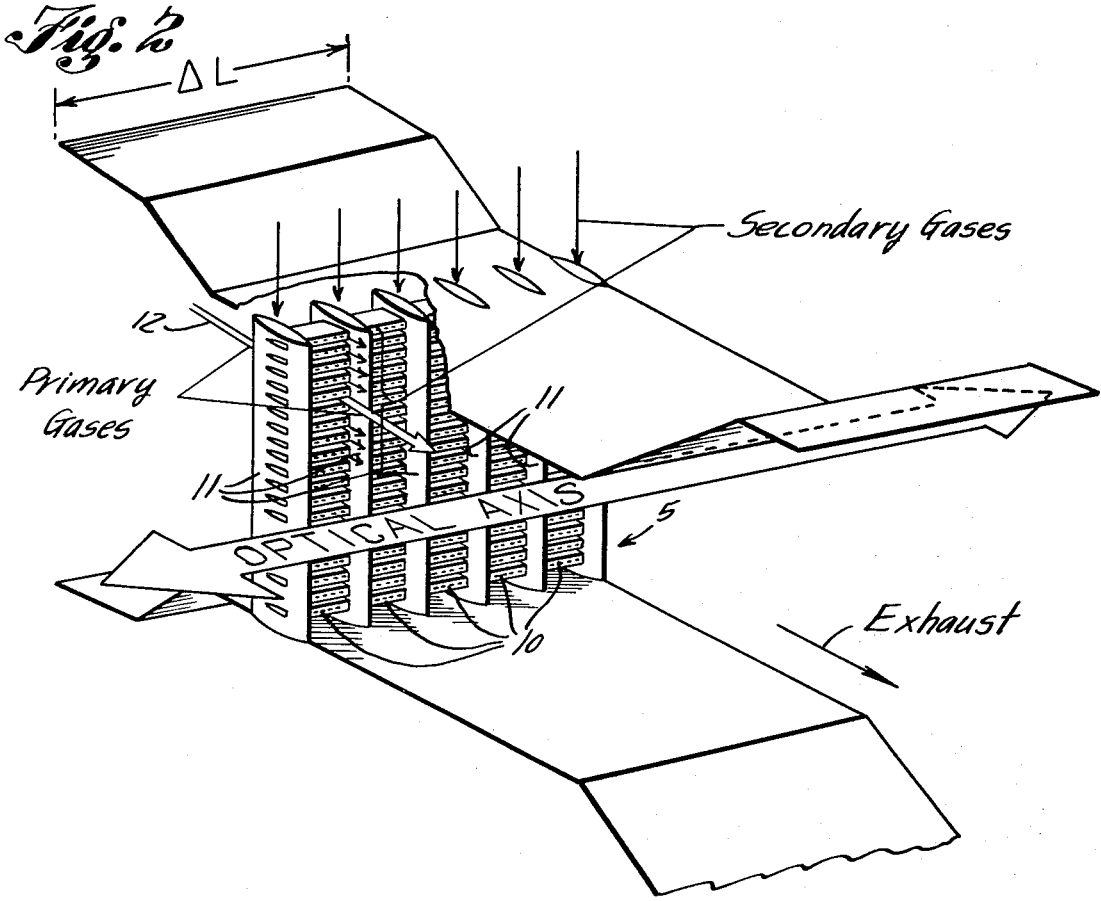
FIG. 2 is a perspective view of the manifold-injector matrix showing the direction of flow and the orientation of the optical axis.

FIG. 2 is an expanded diagram of matrix 5 in FIG. 1. This matrix is composed of a parallel array of horizontal conduits 10 oriented in a plane transverse to the primary gas flow with small aperture orifices or slits located along their length. The horizontal conduits along with these apertures are called injector sections for the purpose of this patent. The primary gas flows between the injector sections as indicated by the heavy arrow 12. The secondary gases enter the conduits from vertical manifolds 11 which are designed as hollow air foils so as not to disturb the flow field of the primary gas. These manifolds support the injector sections and cooperate therewith to deliver gas to the orifices in the adjoining conduits. The width of the manifold injector matrix is $\Delta L$. It will be appreciated that $\Delta L$ can be large when large volumes of gas are used. The secondary gas is emitted through the orifices in the conduits which are of such a small size and intimate spacing that mixing by diffusion, enhanced to some degree by momentum transfer and pressure inequality, can occur in characteristic times that are short compared to the characteristic collisional relaxation times for excitation energy of the mixed gases at the pressures typically encountered in gas laser systems. These pressures are typically from about 1 torr to about 100 torr. Further, sizes and spacings of the injector sections are such that the wall collisions which do occur are insufficient to cause appreciable loss of excitation energy. This is not so much due to the profile of the conduit but is rather due to the velocity of the gas at the injector section surface. As a result, the horizontal conduits may be fabricated from stainless steel tubes through which holes of five one-thousandths of an inch are bored by electron beam drilling techniques.

The diffusion mixing in this system is accomplished because of the small aperture size and because of the number of orifices from which the secondary gas is emitted. The rapid mixing results because the characteristic mixing time decreases inversely with the square of the characteristic gas jet dimension. Thus, the jet dimensions can be reduced with the use of small orifices to increase the rate of mixing. These apertures function as nozzles since the gas ejected therefrom fans out at some predetermined angle. This angle is wider, the narrower the aperture. The wider the angle, the more diffusion mixing that will occur.

As stated hereinbefore, structures transverse to the gas flow have little or no effect on the quality of the output of the laser. It is this finding that enables the interposition of so many horizontal injector sections in the path of the primary gas.

Figure 3:
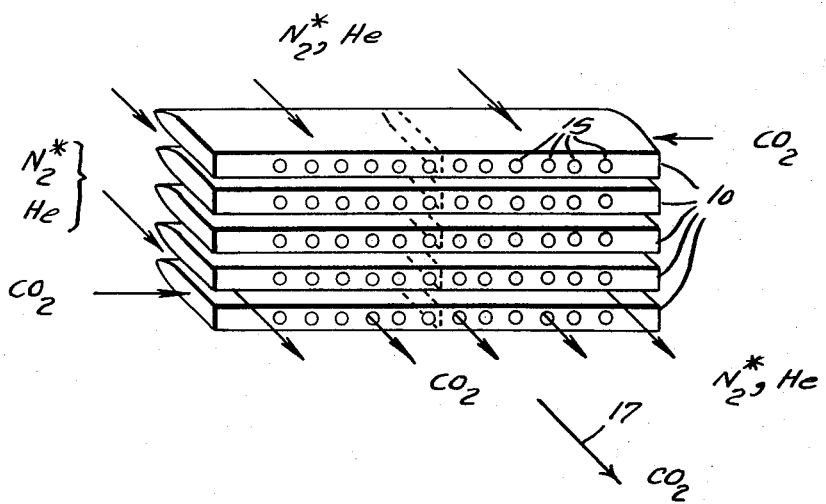
FIG. 3 is a diagram of a series of injectors showing the reactions in an energy exchange-type flowing gas laser.

FIG. 3 shows the preferred shape of conduits 10 for an "energy exchange" type of laser. In this type of laser, a gas mixture of excited nitrogen in a helium carrier is used as the primary gas. The nitrogen is typically excited either thermally or electrically. Unexcited carbon dioxide is supplied to the ends of these conduits and is ejected therefrom through nozzles formed by orifices 15 so that the unexcited $CO_2$ gas is ejected parallel to the primary gas flow. The nitrogen is mixed with the carbon dioxide and couples energy to the P(18) vibrational-rotational transition of carbon dioxide at 10.57 microns. This excited state is noted by the asterisk adjacent arrow 17. It will be noted that in a fluid mixing $CO_2$ laser system, attention must be paid to the aerodynamic design of the injector sections and manifolds to smoothly accommodate high speed but subsonic flowing gases. In the preferred embodiment, the injector sections are designed as tapered air foils with flat transverse trailing edges. The injection of the secondary gas occurs in the wake created at the flat trailing edge. However, it has been found that tubular conduits operate satisfactorily and are easier to fabricate.

Figure 5:
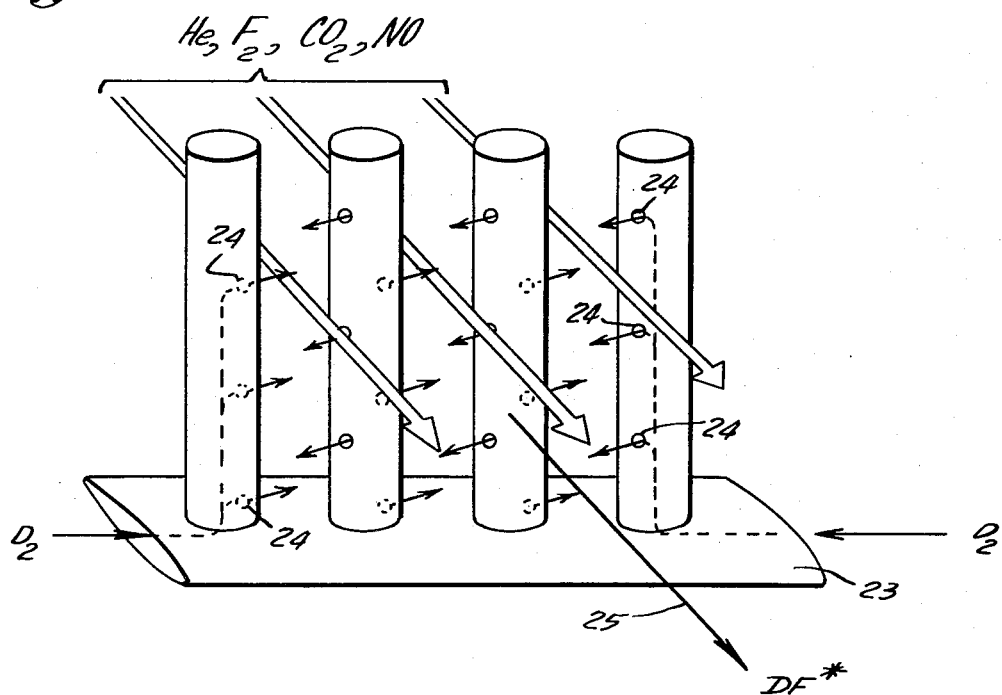
FIG. 5 shows an injection system wherein the secondary gas is injected transverse to the primary flow stream.
Figure 6:
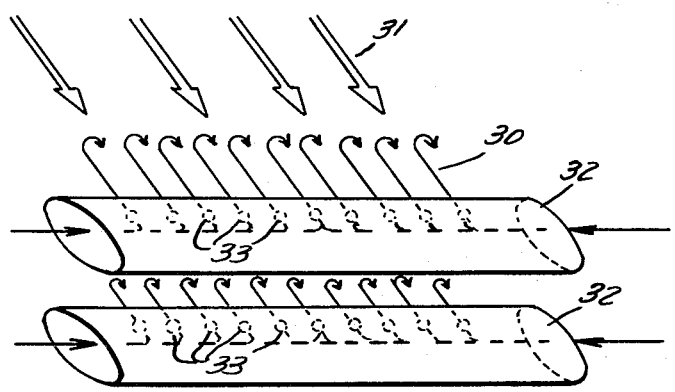
FIG. 6 is a diagram of an injection against the primary flow stream.

The present technique also includes the possibility of injection occurring laterally in a direction transverse to the primary gas flow, as indicated for chemical lasers in FIG. 5, or injection directed upstream against the primary flow at the leading edge of each injector section as shown in FIG. 6.

In one operating embodiment of the "energy exchange" laser, 16 air foil injector sections were used, each having 12 injection orifices with apertures as large as 0.028 inch diameter. These air foil injector sections were fed with $CO_2$ at their ends by hollow vertical manifolds located in the side walls as shown in FIG. 2. The gap separating the injector sections was on the order of 0.040 inch. Flow velocities in the mixed flows were typically 200 meters per second and 90 meters per second for 2.54 centimeters ID and 5.1 centimeters ID injector section conduits, respectively. The average gain coefficient for a fluid mixing laser of this type was 5.5 per meter, indicating a uniform velocity profile and uniform mixing of components immediately downstream of the injector orifices.

Figure 4:
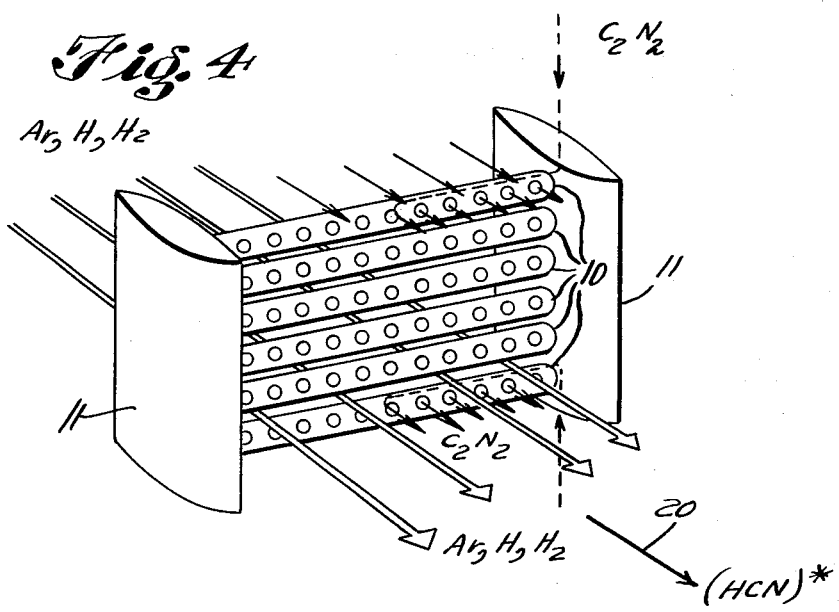
FIG. 4 is a diagram showing tubular injectors coupled to vertical air foil manifolds and includes one example of a chemical laser.

FIGS. 4 and 5 illustrate the subject mixing device in purely chemical lasers. As in the "energy exchange" laser, the injector sections 10 are oriented in a plane transverse to the primary flow and are fed by manifolds 11 with a secondary gas mixture. The orifices in the injector sections are kept small as in the "energy exchange" laser case, and are on the order of 0.005 inch. In FIG. 4, the injector sections are tubular to illustrate that the horizontal members need not be air foils of the type described in connection with FIG. 3. In this particular chemical laser, Cyanogen ($C_2N_2$) is used as the secondary gas. The secondary gas could also be hydrogen iodide (HI) or a mixture of these two components. The primary gas mixture is composed of hydrogen atoms and hydrogen molecules in a carrier argon gas. This mixture is prepared upstream of the plane of the manifolds and injectors with the aid of an electrical discharge. The chain reactions which occur during the mixing process are as follows:

$$H + C_2N_2 \rightarrow HCN + CN$$

and $$H_2 + CN \rightarrow (HCN)^* + H$$

or the reactions $$H + C_2N_2 \rightarrow HCN + CN$$

and $$HI + CN \rightarrow (HCN)^* + I$$

The resulting excited gas is shown by arrow 20. It is proposed that the above reactions would lead to the selective excitation of the fundamental C—H stretching vibration at 3,310 cm$^{-1}$, providing a population inversion between the (00$^0$1) vibration level and the (10$^0$0) and the (03$^1$0) vibrational levels enabling laser action at 8.3 microns. It will be noted that the secondary gas is emitted parallel to the primary flow field in this figure.

As mentioned previously, the ejection may take place either transverse to the primary flow field or directly against it.

FIG. 5 illustrates this type of ejection in a newly developed DF—CO$_2$ purely chemical laser which operates in the 10.6 micron region and which requires no external energy source to initiate or sustain laser excitation. The excited state of the carbon dioxide results from the vibration-rotation state populations for the P and R branch CO$_2$ (00$^0$1)—CO$_2$ (10$^0$0) transitions.

The primary gas flows in this chemical laser are premixed portions of F$_2$ with He combined with premixed portions of NO and CO$_2$. All of these components are premixed and are allowed to react with D$_2$ as shown in FIG. 5. The reaction of these components is shown by the following equations:

$$F_2 + NO \rightarrow ONF + F$$

and $$F + NO \rightarrow ONF$$

In this case the D$_2$ gas is injected transverse to the primary flow by vertically oriented injector sections 22. In the operating embodiment of the DF—CO$_2$ laser, a row of 31 parallel stainless steel tubes of 1 cm length and 0.065 inch diameter with a center-to-center spacing of three-sixteenths of an inch were supplied at one end by a manifold 23. Gas injection was accomplished by three jets on each side of each tube which permitted the secondary gas to intersect the primary flow at right angles in the staggered array shown in FIG. 5. Each of orifices 24 were 0.006 inch in diameter. The resultant rapid mixing of the deuterium gas with the primary flow allowed the following chain propagation reactions to occur:

$$F + D_2 \rightarrow DF^* + D$$

and $$D + F_2 \rightarrow DF^* + F$$

The resulting excited state of DF is shown by arrow 25. With helium flows of 112 millimoles per second, CO$_2$ flows at 57 millimoles per second, fluorine flows at 7.3 millimoles per second, nitric oxide flows of 1.2 millimoles per second and deuterium gas flows at 6.5 millimoles per second, oscillation was observed on the P(20) transition at 10.592 microns.

FIG. 6 is included to shown that the secondary gas indicated by arrows 30 can be injected against the incoming flow of primary gas shown by arrows 31. This is accomplished by orienting injector sections 32 in such a manner that orifices 33 face upstream. Because of the rapid mixing downstream of the injectors, any turbulence produced by such an injection is rapidly smoothed by the flow of the mixed gases back over the injector sections.

It will be appreciated that the three types of injection, parallel, transverse and against the primary flow, may be used in any fluid mixing laser when the subject injector matrixed array is used.

As mentioned hereinbefore, the injection section matrixed array may be expanded almost indefinitely. This expansion may be carried out as shown in FIG. 7. In this expansion, vertical manifolds 40 are coupled to a transverse manifold 41 to which is coupled a secondary gas. This secondary gas is coupled through manifolds 40 and 41 to horizontal injector sections 42. At the same time, the secondary gas is coupled to transverse manifold 45 which feeds vertical manifolds 46 and injector sections 48. The top portions of manifolds 46 are also coupled to transverse manifold 41 in this manner. The array may be extended in both the horizontal and vertical directions by merely adding more transverse manifolds and more vertical manifold sections while increasing the number of injector sections and increasing the secondary gas pressure.

The subject array therefore produces rapid mixing of gases used in fluid mixing laser systems. Both the rapid mixing and the absence of wall de-excitation make possible expansion of the array to any extent and thus permit increasingly larger volumes of gas to be used in the laser system. With the use of increasing amounts of gas are the accompanying higher power outputs for which the subject array was designed.

What is claimed is:

1. Apparatus for use in a gaseous laser for mixing a first gas with a stream of a second gas which is flowing into the cavity region of said laser, comprising a multiplicity of hollow air-foil sections arranged in vertical columns that extend across the width of said stream and lie in a plane that is transverse to the direction of flow of said stream;

a multiplicity of horizontal rows of tubular conduits interconnecting and internally communicating with said hollow air-foil sections, each of said tubular conduits having a plurality of extremely small orifices communicating with the interior thereof which are located on the upstream side of said conduits; and means for supplying said hollow air-foil sections at either or both ends thereof with said first gas whereby this gas flows through said hollow air-foil sections, enters all of said tubular conduits at opposite ends thereof and is injected through said orifices into said stream before it reaches said tubular conduits, thereby causing the mixing of said gases, with any turbulence accompanying this mixing being rapidly smoothed by the flow of the mixed gases over the tubular conduits, and the formation of a homogeneous product gas in a short time compared to the relaxation tome of this product gas.

2. In an arrangement as defined in claim 1, a source of said second gas;

a delivery tube coupled at one end thereof to said source and having the other end portion thereof restricted to form a reduced throat area which compacts said second gas and removes any flow anomalies which may exist in said delivery tube, said plane wherein said air-foil sections lie being located immediately adjacent the exit portion of said throat.

* * * * *